(12) United States Patent
Neill

(10) Patent No.: US 7,532,115 B2
(45) Date of Patent: May 12, 2009

(54) WIRELESS POSITION FEEDBACK DEVICE AND SYSTEM

(75) Inventor: Patrick W. G. Neill, N. Vancouver (CA)

(73) Assignee: Honeywell ASCA Inc., Ontario (CA)

( * ) Notice: Subject to any disclaimer, the term of this patent is extended or adjusted under 35 U.S.C. 154(b) by 274 days.

(21) Appl. No.: 11/501,127

(22) Filed: Aug. 8, 2006

(65) Prior Publication Data

US 2007/0159161 A1  Jul. 12, 2007

Related U.S. Application Data

(60) Provisional application No. 60/754,770, filed on Dec. 29, 2005.

(51) Int. Cl.
*G08B 1/08* (2006.01)
*G01R 31/28* (2006.01)
*G05D 7/00* (2006.01)
*G08B 25/08* (2006.01)

(52) U.S. Cl. .............................. 340/539.22; 324/158.1; 700/282; 340/693.3

(58) Field of Classification Search ............ 340/539.22, 340/693.3; 324/158.1; 700/282
See application file for complete search history.

(56) References Cited

U.S. PATENT DOCUMENTS

| | | | |
|---|---|---|---|
| 6,267,349 B1 * | 7/2001 | Gomes et al. ............ 251/30.04 |
| 6,565,333 B2 * | 5/2003 | Maruyama ................... 417/417 |
| 7,339,489 B2 * | 3/2008 | Arita et al. ................ 340/693.3 |
| 2003/0178530 A1 * | 9/2003 | Tartaglia et al. .......... 244/110 R |
| 2005/0017602 A1 | 1/2005 | Arms et al. |
| 2005/0139250 A1 * | 6/2005 | DeSteese et al. ............. 136/212 |
| 2005/0150281 A1 | 7/2005 | Schroeder et al. |
| 2005/0219962 A1 * | 10/2005 | Ollila ........................ 369/13.11 |
| 2005/0278074 A1 * | 12/2005 | Junk et al. ................... 700/282 |

FOREIGN PATENT DOCUMENTS

WO  WO 2005/108924 A1  11/2005

OTHER PUBLICATIONS

Macro Sensors, GSA 750 Series: Low Cost Spring Loaded LVDT Position Sensors, Technical Bulletin 3006, Feb. 2002, pp. 1-2, Pennsauken USA.

* cited by examiner

*Primary Examiner*—Daniel Wu
*Assistant Examiner*—Jack Wang
(74) *Attorney, Agent, or Firm*—Scully, Scott, Murphy & Presser, PC

(57) ABSTRACT

A wireless position feedback device incorporated in a monitored device. The position feedback device measures a position of a moving element of the monitored device, generates a local power supply based upon local environmental characteristics and conditions. The wireless feedback device stores the local power supply for use in transmitting the measured position to a remote control system. The remote control system adjusts at least one operational parameter for the monitored device based upon the measured position.

15 Claims, 3 Drawing Sheets

WIRELESS POSITION FEEDBACK DEVICE AND SYSTEM

CROSS REFERENCE TO RELATED APPLICATION

The present application claims priority from U.S. Provisional Application No. 60/754,770 filed on Dec. 29, 2005.

FIELD OF THE INVENTION

The invention is directed to a wireless position feedback device, and more particularly to a self-powered position feedback device that transmits position information regarding a monitored device to a remote control system. The invention is further directed to a control system that includes the wireless position feedback device, where the position data is fedback to a controller to modify an operational parameter based upon the position data.

BACKGROUND OF THE INVENTION

In the modern world of automation, almost every device or machine includes moving elements. Often, these moving elements are in a location that is inaccessible while operating. Therefore, there is a great importance in having advanced warning that maintenance is required. This advanced warning is typically in the form of position awareness for each element. This allows problems and malfunctions to be isolated and replaced with minimal effort, expense, and down-time.

The success of a system is dependent on the ability to measure a position for each element and communicate this position to a remote location. Varying pressure from a pneumatic or hydraulic source typically controls the position of the moving device.

Currently, a positional control system comprises a controller device, control means, a device under control, a wired communications network and a device to measure the position. The position-measuring device measures position data of an element of the device under control and communicates this information to a control device using a communications cable. Additionally, the position-measuring device includes an external power source to power the device.

However, the current requirement for an external power source to be connected to the position-measuring device creates a problem in a harsh environment where it is impractical or impossible to install electronics and wires to provide a power source or where an external power source is unavailable.

Another position control system includes a controller device, control means, a device under control and a device to measure pressure. The position of the device is controlled by varying the fluid pressure. Thus the position control of a remote device is achieved indirectly by controlling pressure of a fluid.

In this case there is a high degree of uncertainty as to whether the device is actually moving as the pressure is varied and it is impractical or undesirable to utilize a wired position sensor.

Accordingly, there is a need for a position feedback device that can create or derive its own power source based upon local environments and movement conditions such that there is no need for electrical wiring. Further, there is a need for a wireless position feedback device to be able to communicate with a control device without the need of wires.

Accordingly, there is a need for a wireless position feedback device that is capable of generating its own power and can accurately measure the position of a device under monitoring.

BRIEF SUMMARY OF THE INVENTION

Accordingly, disclosed is a wireless position feedback device that is installed in a monitored device that derives its electric power from local environmental characteristics and conditions. The wireless position feedback device measures position data of elements of the monitored device and wirelessly transmits this position data to a control device. The control device can modify operational parameters of the monitored device based upon the received position data. The wireless position feedback device will allow for closed loop position control or provide early detection of a problem with the monitored device.

Disclosed is a wireless position feedback system that comprises a monitored device and a wireless position feedback device incorporated in the monitored device. The position feedback device includes a means for measuring a position of an element of the monitored device, means for generating a local power supply based upon local environmental characteristics and conditions, means for storing the local power supply, and a wireless means for transmitting the measured position to a remote control system. In an embodiment, the remote control system can adjust at least one operational parameter for the monitored device based upon the measured position. In another embodiment, the position information is monitored, however, a control signal is not feedback.

The means for measuring a position can be a linear potentiometer comprised of a spring-loaded magnetic rod and the means for generating the local power supply in the spring loaded magnetic rod. At least one coil is wrapped around the spring loaded magnetic rod. The local power supply is generated based upon movement of the element in the monitored device, which causes the spring loaded magnetic rod to move.

Alternatively, the local power supply can be generated from other local environmental characteristics and conditions such as a thermal gradient between steam and a surrounding ambient temperature using a thermal coupler. Furthermore, the local power supply can be generated from airflow using a turbine generator.

Also disclosed is a wireless position feedback device that comprises a spring-loaded magnetic rod that oscillates in response to movement of a bellow of a pneumatic actuator, a coil wrapped around the spring loaded rod to generate an electric current based upon the oscillation of the spring loaded rod, and a circuit for storing the electric current for a period of time such that a position measurement can occur and transmission of the position measurement is made to a remote controller.

BRIEF DESCRIPTION OF THE DRAWINGS

These and other features, benefits and advantages of the present invention will become apparent by reference to the following text and figures, with like reference numbers referring to like elements across the views, wherein.

DETAILED DESCRIPTION OF THE INVENTION

Figure 1:
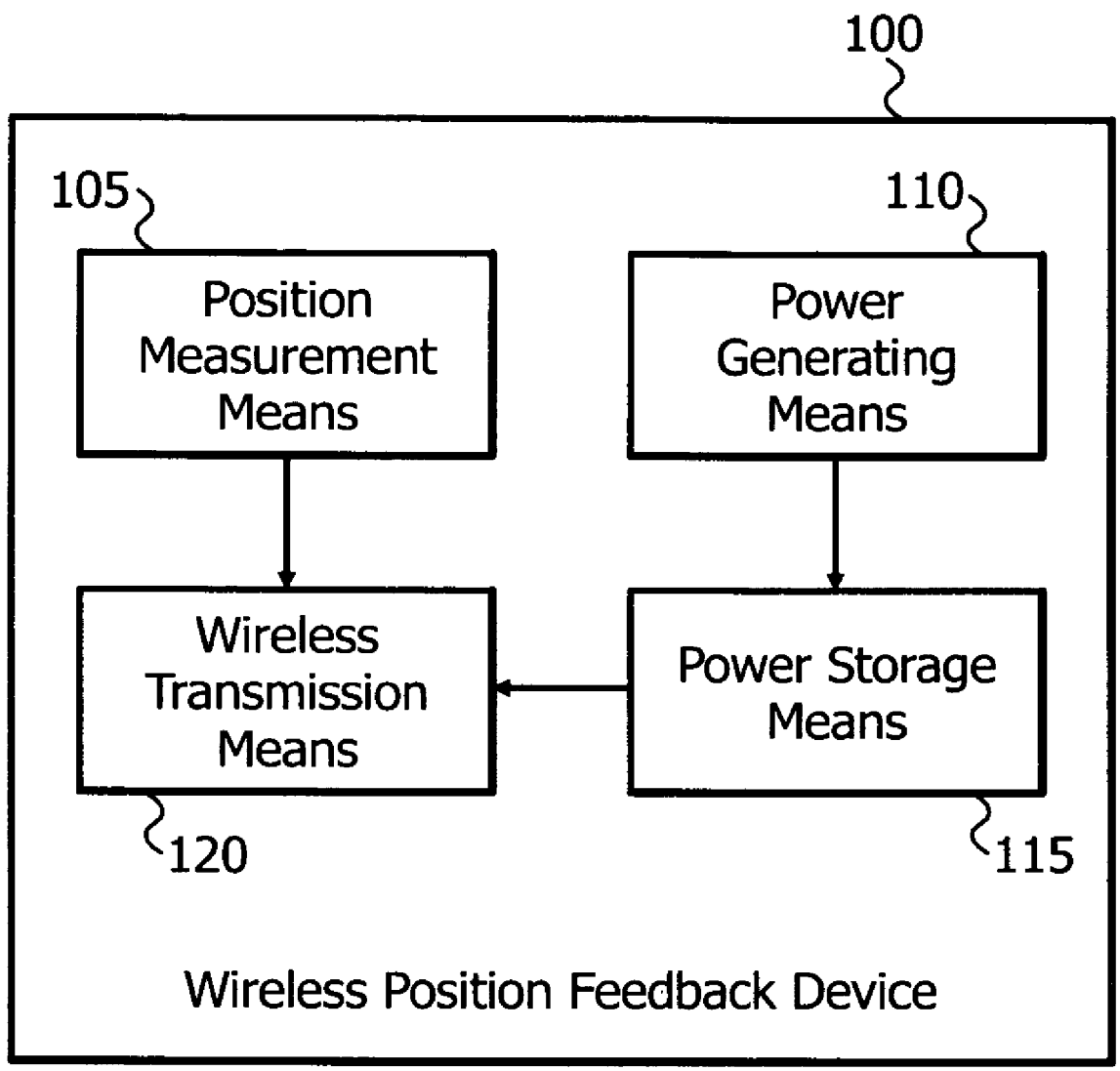
FIG. 1 illustrates a wireless position feedback device according to one embodiment of the invention.

FIG. 1 illustrates a wireless position feedback device 100 according to one embodiment of the invention. The wireless position feedback device 100 includes a position measurement means 105, a power generating means 110, a power storage means 115, and a wireless transmission means 120. The position measurement means 105 can be a discrete or continuous position sensor. A discrete sensor can include limit switches, inductive switches, magnetic reed switches, Hall effect devices, and magnetoresistive switches. Continuous position sensors include a spring-loaded magnetic rod, a potentiometric transducers, inductive transducers, such as linear variable differential transducers (LVDT), magnetostrictive transducers, and encoders. The LVDT works by moving an electromagnetic core or center linearly across primary and secondary windings of a transformer. When the core is centered, there is no displacement and, therefore, no feedback signal. As the core is moved, the amplitude voltage increases proportionally to the movement of the core. The use of a continuous position sensor allows for the exact position of the element to be continuously detected, whereas the discrete sensor is typically used for a determination of an absolute displacement, i.e., a switch. Typically, in a discrete sensor a voltage signal is compared to a predetermined voltage and when that value is exceeded, the switch closes indicating displacement.

In one embodiment of the invention the position measurement means 105 is a spring-loaded magnetic rod that will move up and down in a manner similar to a linear potentiometer. The spring loaded magnetic rod will have a coil wrapped around it.

The power generating means 110 will power the wireless position feedback device 100 using a local energy source. The power generating means 110 will use the surrounding environmental characteristics and conditions to generating the power supply. For example, power may be derived from the mechanical motion of any of the elements within a device that the wireless position feedback device 100 is monitoring. The power supply can be generated from the motion of the spring loaded magnetic rod and the coil, as will be described later in greater detail. Additionally, the power generating means 110 can use other environmental conditions such as the thermal difference between two surrounding areas, the flow of air or steam or an inductive energy coupling.

The power generating means 110 can include a thermocouple such as a Peltier device, a steam turbine, or inductive energy coupling.

In one embodiment the power generating means 110 is a thermocouple, one terminal of the thermocouple will be positioned near the surrounding air having an ambient temperature. The second terminal is positioned near a heat source, such as steam. The difference between the air temperature and the temperature of the steam will cause electric current to flow into the power storage means 115. The amount of current that will be produced is dependent on the difference between the temperature and the characteristic of the metals used for each terminal. The power storage means 115 will collect and store the power.

In another embodiment, the power generating means 110 is a miniature steam turbine positioned proximate to a steam valve, to a steam release point or a pneumatic airflow valve or air release point. The airflow or flow of steam will cause the miniature steam turbine to rotate which creates electricity to flow into the power storage means 115. The miniature steam turbine is attached to a power generator. The steam rotates a metallic rod in the power generator and causes power to be generated by a plurality of surrounding coils. The power storage means 115 will collect and store the power.

The power storage means will include at least one capacitor that will be charged by the power generating means 110.

The wireless position feedback device 100 includes a wireless transmission means 120. The wireless transmission means is a wireless antenna or aerial that is capable of transmitting a wireless signal to a controlling device. This wireless signal will include position information regarding at least one element of the monitored device.

While the position measurement means 105 and the power generating means 110 have been described as two separate elements, the position measurement means 105 and the power generating means 110 can be the same element. For example, a spring-loaded magnetic rod used in conjunction with a wrapped coil can function as both a position measurement means and a power generating means. The generated current is proportional to the displacement of the magnetic road. The generated current is also supplied to the power storage means 115 as a power supply for the transmission means 120.

Additionally, the power generating means 105 has been described as one of mechanical power source, thermocouple, a steam turbine or inductive energy coupling device; however, more than one type of power supply can be used. This might be particularly useful if the position generating means requires a power source, e.g., LVDT. The multiple power sources can be connected in series with each other and then coupled to the power storage means 115. For example, a cylinder actuator with a long enough stroke generates power from the motion of the cylinder rod relative to the cylinder housing. Additionally, a turbine can be positions with the airflow such that the airflow in and out of the cylinder that would drive a turbine.

Figure 2:
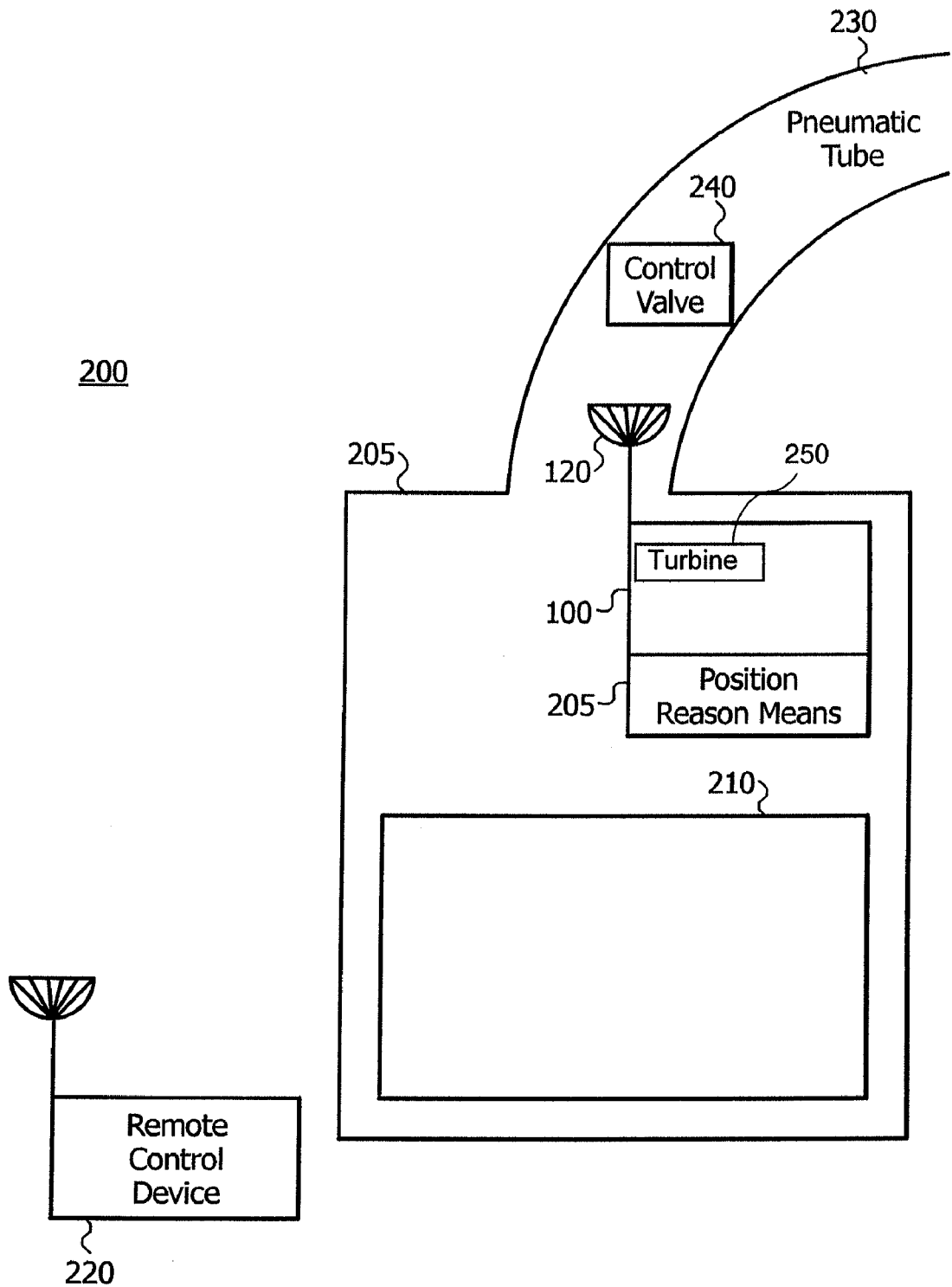
FIG. 2 illustrates the wireless position feedback system according to the invention.

FIG. 2 illustrates the wireless position feedback system 200 according to the invention. The wireless position feedback system 200 includes a monitored device 205, the wireless position feedback device 100, at least one moving element of the monitored device 210, a control device 220, pneumatic tube 230 attached to the monitored device 205 and control valve 240 that controls the airflow from the pneumatic tube 230. The monitored device 210 can be any pneumatically controlled device, such as a control valve for regulating flow of a fluid applications, e.g., controlling flow of gas, steam, water, slurries & chemicals. In accordance with the invention, a plurality of different types of valves can be used, such as linear type; diaphragm, globe and pinch valves; or ball, butterfly and plug valves. Additionally, the monitored device 205 can be a machine for loading and unloading, material handling, product assembly, robotics, welding, packing, louvers, dampers, testing and quality control.

The position of the valve or device reached depends on the force applied by the pneumatic pressure and the backward force applied by the component being moved. The backward force may come from a spring or the process fluid pressure or the weight of the component itself, friction, or a combination thereof. The pneumatic pressure applied by the remote control device 220 controls the position of the valve or device. The pneumatic pressure is controlled using the control valve 240 positioned in the pneumatic tube 230. The control valve 240 is controlled by the remote control device 220. The remote control device 220 determines the pneumatic pressure based upon the position data that is fedback.

As depicted in FIG. 2, the wireless feedback position device 100 is positioned above the moving element 210. However, the wireless fedback position device does not have to be located above the moving element. Placement of the wireless feedback position device 100 is dependent upon the type of monitored device, the location of the movement and environmental conditions, such as location of a heat source, and airflow source. Furthermore, as depicted, the position measurement means 105 and the power generation means 110 are located proximate to each other, however, the two can be separated from each other. For example, the position measure means 105 can be placed below the bellows, whereas the power generating means 110 can be positioned above the bellows and near the airflow source, e.g., by the air supply connection. The wireless feedback position device 100 measures the position of the moving element 210 using the position measurement means 105 and transmits the position data to the remote control device 220 using the wireless transmission means 120.

Figure 3:
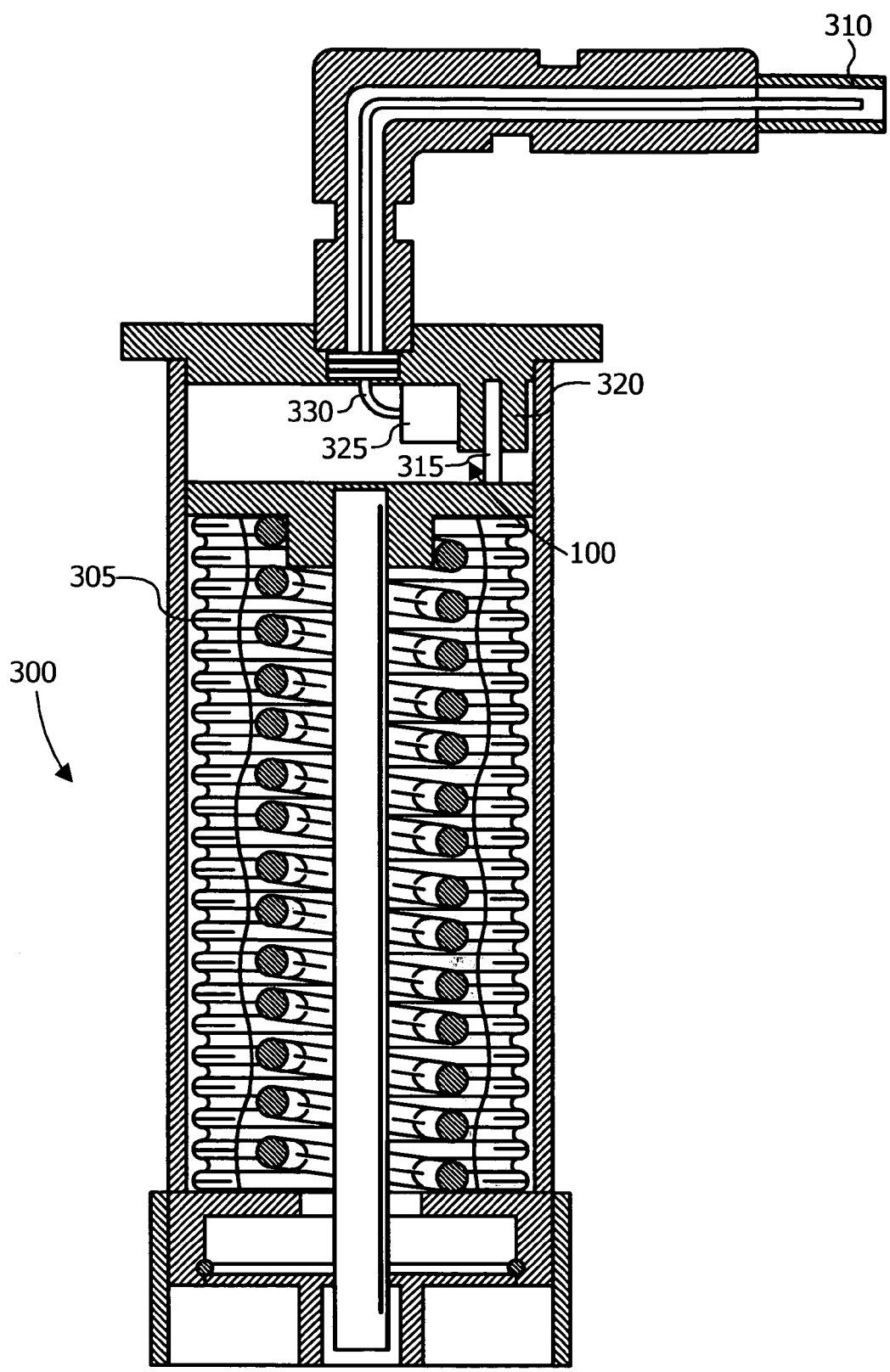
FIG. 3 illustrates an example a pneumatic actuator having a wireless feedback position device 100 of the invention.

In one embodiment of the invention, a miniature turbine 250 will be positioned proximate to or in the pneumatic tubing 230 to generate power as the wireless feedback position device's power generating means 110. The turbine 250 will take advantage of the semi-continuous source of pneumatic air from the tubing to generate energy, FIG. 3 illustrates an example of a pneumatic actuator 300 having a wireless feedback position device 100 of the invention. The pneumatic actuator 300 includes a pneumatic tube 310 that acts as an air supply line for the actuator 300, and a Bellows portion 305 that moves up and down as the pneumatic pressure is varied. A wireless feedback position device 100 is positioned above the Bellows portion 305 and below the pneumatic tube 310, the pneumatic region. The pneumatic tube 310 is attached to the top of the actuator 300.

The wireless feedback position device 100 includes a spring-loaded magnetic rod 315 that will move up and down in a manner of a linear potentiometer as the Bellows below moves. The magnetic rod will act as a position measuring means. The motion of the rod will generate an electric current in a coil 320 that is wrapped around the rod 315. The electric current will be stored in a storage circuit 325 long enough to carry out the position measurement and to transmit the position data to a control device (not shown) via a wireless aerial antenna 330. The aerial antenna 330 is extended up into the pneumatic tube 310 to facilitate wireless transmission. It is unnecessary to sustain a continuous power source for the wireless feedback position device since the position only needs to be reported if there is movement in the actuator or if the actuator has just completed a movement.

The position data is fedback to control the pneumatic pressure from the pneumatic tube 310.

The above description and drawings are given to illustrate and provide examples of various aspects of the invention, and is not intended to limit the invention to the examples or illustrations. Given the benefit of the above disclosure, those skilled in the art may be able to devise various modifications and alternate constructions that, although differing from the examples disclosed herein, nevertheless enjoy the benefits of the invention and fall within the scope of the invention.

What is claimed is:

1. A wireless position feedback system comprising: a wireless position feedback device incorporated in a device, said position feedback device includes a means for measuring a position of an element of said monitored device, means for generating a local power supply based upon selected from a member of a group consisting of a thermal gradient between components of said device and a flow of a fluid, and a wireless means for transmitting the measured position to a remote control system.

2. A wireless position feedback system comprising: a wireless position feedback device incorporated in a device, said position feedback device includes a means for measuring a position of an element of said monitored device, means for generating a local power supply based upon movement of the element in the monitored device which causes said spring loaded magnetic rod to move, and a wireless means for transmitting the measured position to a remote control system, wherein said means for measuring a position is a position measurement sensor comprised of a spring loaded magnetic rod and said means for generating said local power supply in said spring loaded magnetic rod and at least one coil wrapped around said spring loaded magnetic rod.

3. The wireless position feedback system of claim 1, wherein said means for generating a local power supply is a thermal gradient between components of said device.

4. The wireless position feedback system of claim 1, wherein said means for generating a local power supply is a thermal coupler.

5. The wireless position feedback system of claim 1, wherein said means for generating a local power supply is a flow of a fluid.

6. A wireless position feedback device comprising:
 a spring-loaded magnetic rod that moves in response to movement of a pneumatic actuator;
 a coil wrapped around the spring loaded rod to generate an electric current based upon the movement of the spring loaded rod; and
 a circuit for storing the electric current for a period of time such that a position measurement can occur and transmission of the position measurement is made to a remote controller.

7. The wireless position feedback device of claim 6, further comprising a short aerial antenna means for transmitting the position measurement.

8. The wireless position feedback device of claim 6, wherein said position measurement is used to control a flow of fluid into the actuator.

9. The wireless position feedback system of claim 1, wherein said remote control system adjusts at least one operational parameter for said monitored device based upon the measured position.

10. The wireless position feedback system of claim 1, further including a means for storing said local power supply.

11. The wireless position feedback system of claim 1, wherein said device includes at least one component whose position is controlled pneumatically or hydraulically.

12. The wireless position feedback system of claim 2, wherein said position measurement sensor is a potentiometer.

13. The wireless position feedback system of claim 1, wherein said means for generating a local power supply is a turbine, said turbine generates power based upon the flow of said fluid.

14. The wireless position feedback system of claim 13, wherein said fluid is air.

15. The wireless position feedback system of claim 13, wherein said fluid is water.

\* \* \* \* \*